(12) United States Patent
Wojcik et al.

(10) Patent No.: US 11,624,398 B2
(45) Date of Patent: Apr. 11, 2023

(54) INPUT SHAFTS FOR GENERATORS

(71) Applicant: Hamilton Sundstrand Corporation, Charlotte, NC (US)

(72) Inventors: Craig J. Wojcik, Evansville, WI (US); Ted A. Martin, Winnebago, IL (US); Duane C. Johnson, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/861,390

(22) Filed: Jul. 11, 2022

(65) Prior Publication Data

US 2022/0341462 A1 Oct. 27, 2022

Related U.S. Application Data

(62) Division of application No. 16/791,183, filed on Feb. 14, 2020, now Pat. No. 11,396,903.

(51) Int. Cl.
| | | |
|---|---|---|
| *F16C 1/24* | (2006.01) | |
| *F16C 1/02* | (2006.01) | |
| *F16H 57/00* | (2012.01) | |
| *F16H 57/04* | (2010.01) | |

(52) U.S. Cl.
CPC .................. *F16C 1/24* (2013.01); *F16C 1/02* (2013.01); *F16H 57/0025* (2013.01); *F16H 57/043* (2013.01)

(58) Field of Classification Search
CPC ...... F16C 33/6677; F16C 1/24; F16H 57/043; F16H 57/0025
See application file for complete search history.

(56) References Cited

U.S. PATENT DOCUMENTS

| | | |
|---|---|---|
| 3,637,049 A | 1/1972 | Butterfield et al. |
| 4,669,999 A | 6/1987 | Miller |
| 6,022,287 A | 2/2000 | Klemen et al. |
| 6,098,753 A | 8/2000 | Lamarre et al. |
| 7,644,572 B2 | 1/2010 | Labala |

FOREIGN PATENT DOCUMENTS

| | | |
|---|---|---|
| EP | 0980994 A2 | 2/2000 |
| EP | 1600614 A2 | 11/2005 |
| WO | 9964728 A1 | 12/1999 |

OTHER PUBLICATIONS

Extended European Search Report dated Jul. 26, 2021, issued during the prosecution of European Patent Application No. EP 21155013.2.

*Primary Examiner* — Jake Cook
(74) *Attorney, Agent, or Firm* — Locke Lord LLP; Joshua L. Jones; Scott D. Wofsy

(57) ABSTRACT

An input shaft includes an annular main shaft extending along a longitudinal axis with an internal bore configured for fluid flow through the annular main shaft. A generator spline is included on an exterior surface of a first end of the main shaft. A gearbox spline is included on an exterior surface of a second end of the main shaft opposite the first end. At least one orifice is defined through the main shaft from the internal bore to the exterior surface of the second end of the main shaft for flow of fluid from the internal bore to the exterior surface for cooling and lubrication.

18 Claims, 4 Drawing Sheets

INPUT SHAFTS FOR GENERATORS

CROSS-REFERENCE TO RELATED APPLICATIONS

This is a divisional of U.S. patent application Ser. No. 16/791,183 filed Feb. 14, 2020 the content of which is incorporated by reference herein in its entirety.

BACKGROUND

1. Field

The present disclosure relates to mechanical components for electric machines, and more particularly to input shafts for generators.

2. Description of Related Art

A shaft is needed in order to drive a variable speed constant frequency (VSCF) generator. The shaft needs to integrate with an airframe mounted accessory drive (AMAD) which utilizes a shared oil system with the VSCF generator.

The conventional techniques have been considered satisfactory for their intended purpose. However, there is an ever present need for improved systems and methods for input shafts for generators. This disclosure provides a solution for this need.

SUMMARY

An input shaft includes an annular main shaft extending along a longitudinal axis with an internal bore configured for fluid flow through the annular main shaft. A generator spline is included on an exterior surface of a first end of the main shaft. A gearbox spline is included on an exterior surface of a second end of the main shaft opposite the first end. At least one orifice is defined through the main shaft from the internal bore to the exterior surface of the second end of the main shaft for flow of fluid from the internal bore to the exterior surface for cooling and lubrication.

A generator can include a rotor with a spline engaged to the generator spline so the main shaft can drive the rotor rotationally. A gearbox can include a spline engaged to the gearbox spline so the gearbox can drive the main shaft rotationally.

The at least one orifice can be located between the generator spline and the gearbox spline. The at least one orifice can be located more proximate the gearbox spline than the generator spline. The at least one orifice can be located in an annular channel that is contiguous with a medial end of the gearbox spline. The at least one orifice can include exactly two orifices wherein the two orifices are diametrically opposed to one another.

A shear section can be included axially between the generator spline and the gearbox spline. The main shaft can have an annular wall thickness that is thinnest in the shear section. A generator side o-ring groove can be defined in the exterior surface of the first end of the main shaft between the shear section and the generator spline. An o-ring can be seated in the generator side o-ring groove. A gearbox side o-ring groove can be defined in the exterior surface of the second end of the main shaft between the shear section and the gearbox spline. An o-ring can be seated in the gearbox side o-ring groove.

The gearbox spline can have an axial length with a ratio of 0.16 to 1 relative to that of the main shaft. The gearbox spline can have a pitch diameter with a ratio of 1.33 to 1 relative to that of the generator spline. The internal bore can include a step up in diameter, wherein the internal bore has a larger diameter inboard of the gearbox spline than inboard of the generator spline. The step up in diameter can be located at a position 0.70 of the length of the main shaft. A shear section as described above can be axially between the generator spline and the gearbox spline. The shear section can have an exterior surface defining a smaller diameter than that of the internal boar inboard of the gearbox spline. The step up in diameter can be proximate the gearbox side o-ring groove.

A method includes lubricating a gearbox spline on an outer surface of an input shaft using oil driven through an internal bore defined through the input shaft, wherein the oil passes through at least one orifice defined through the input shaft from the internal bore to an exterior surface of the input shaft. The method can include using a gearbox to drive the input shaft and using the input shaft to drive a generator.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
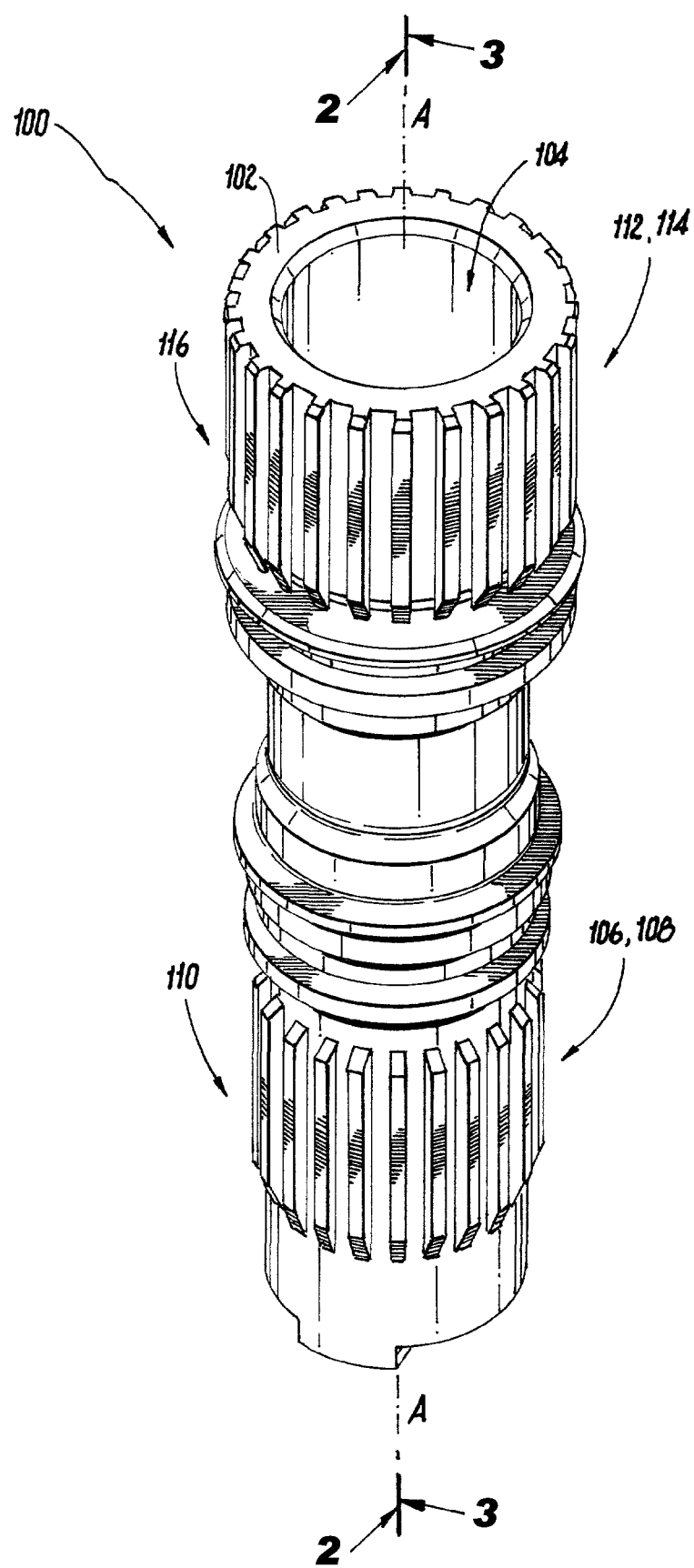
FIG. 1 is a schematic perspective view of an embodiment of an input shaft constructed in accordance with the present disclosure, showing the splines.

Reference will now be made to the drawings wherein like reference numerals identify similar structural features or aspects of the subject disclosure. For purposes of explanation and illustration, and not limitation, a partial view of an embodiment of an input shaft in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to transfer torque, e.g. to a variable speed constant frequency (VSCF) generator from an airframe mounted accessory drive (AMAD).

The input shaft 100 includes an annular main shaft 102 extending along a longitudinal axis A with an internal bore 104 configured for fluid flow through the annular main shaft 102. A generator spline 106 is included on an exterior surface 108 of a first end 110 of the main shaft 102. A gearbox spline 112 is included on an exterior surface 114 of a second end 116 of the main shaft 102 opposite the first end 110.

Figure 2:
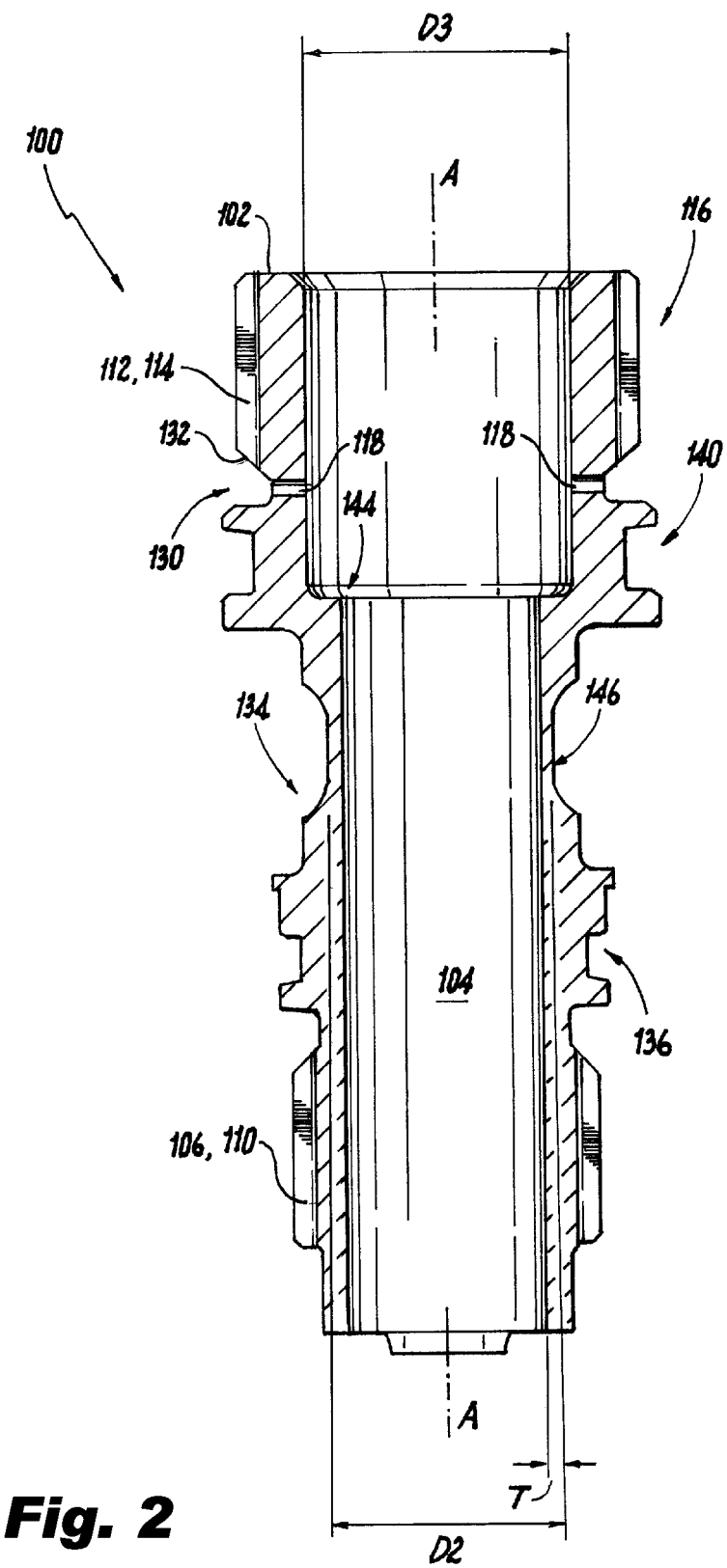
FIG. 2 is a cross-sectional side elevation view of the input shaft of FIG. 1, showing the orifices through the wall of the input shaft.
Figure 3:
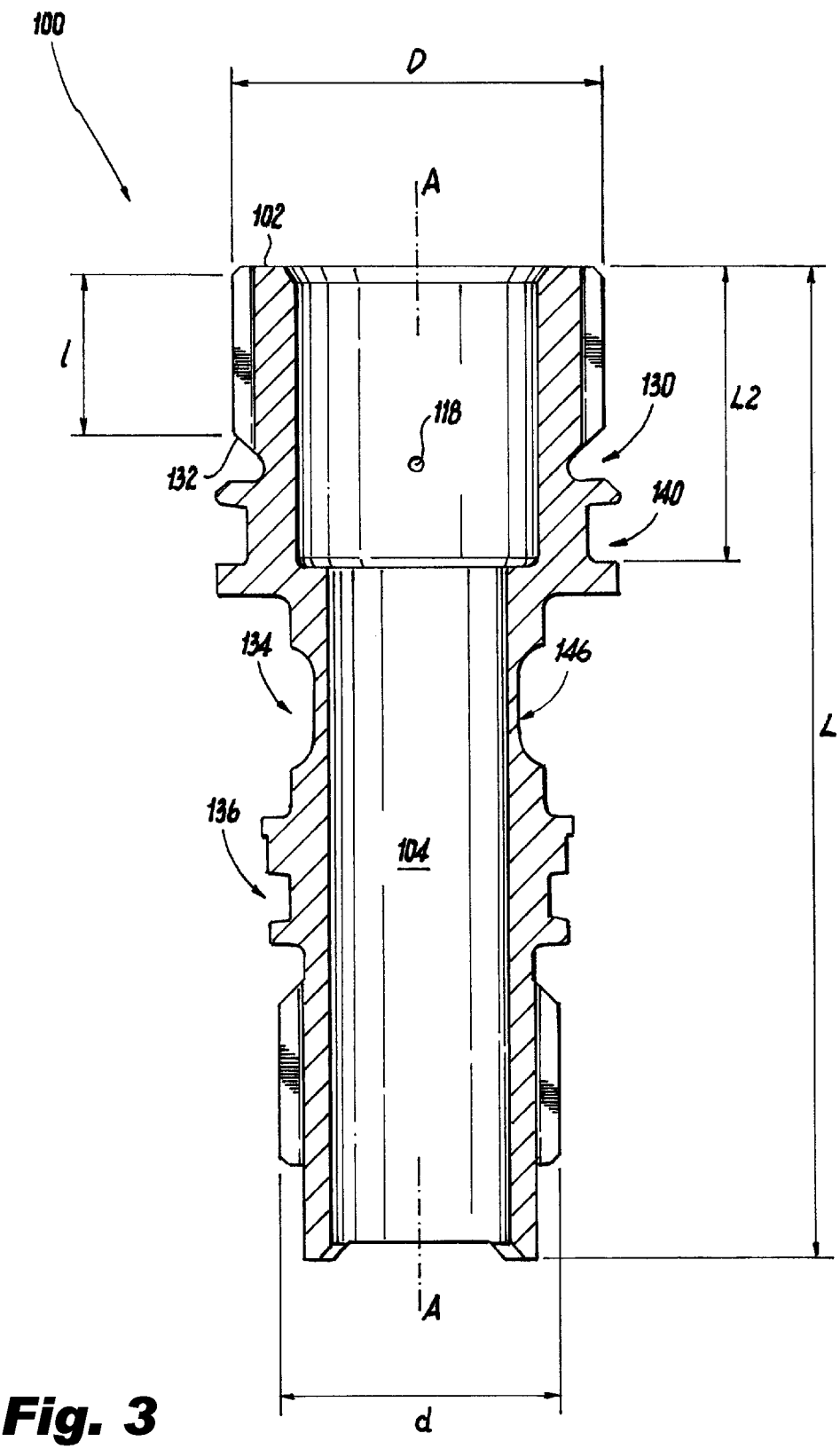
FIG. 3 is a cross-sectional side elevation view of the input shaft of FIG. 2, showing one of the orifices from the angle identified in FIG. 1.

With reference now to FIGS. 2-3, two orifices 118 are defined through the main shaft 102 from the internal bore 104 to the exterior surface 114 of the second end of the main shaft 102 for flow of fluid from the internal bore 104 to the exterior surface 114 for cooling and lubrication of the gearbox spline 112.

Figure 4:
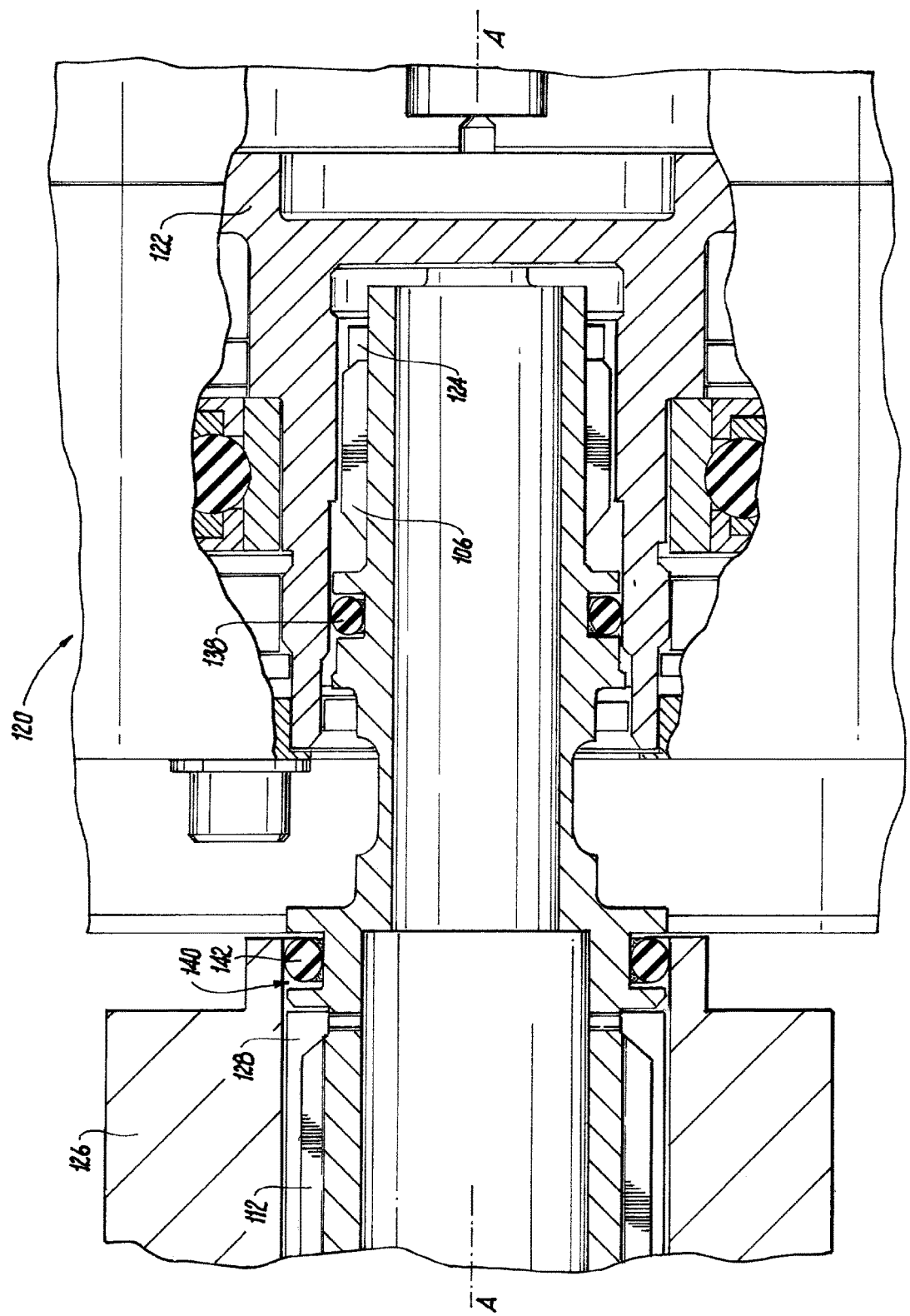
FIG. 4 is a cross-sectional side elevation view of the input shaft of FIG. 1, showing the input shaft engaged with a gear box and a generator.

With reference now to FIG. 4, a generator 120 includes a rotor 122 with a spline 124 engaged to the generator spline 106 so the main shaft 102 can drive the rotor 122 rotationally. A gearbox 126 includes a spline 128 engaged to the gearbox spline 112 so the gearbox 126 can drive the main shaft 102 rotationally, and in turn drive the rotor 122.

With reference again to FIGS. 2-3, the orifices 118 are located between the generator spline 106 and the gearbox spline 112, more proximate to the gearbox spline 112 than to the generator spline 106. The orifices 118 are located in an annular channel 130 that is contiguous with a medial end 132 of the gearbox spline 112. The orifices 118 are diametrically opposed to one another, as shown in FIG. 2.

A shear section 134 is included axially between the generator spline 106 and the gearbox spline 112. The main shaft 102 has an annular wall thickness T that is thinnest in the shear section 134. A generator side o-ring groove 136 is defined in the exterior surface 108 of the first end 110 of the main shaft 102 between the shear section 134 and the generator spline 106. As shown in FIG. 4, an o-ring 138 can be seated in the generator side o-ring groove 136. A gearbox side o-ring groove 140, labeled in FIGS. 2-3, can be defined in the exterior surface 114 of the second end 116 of the main shaft 102 between the shear section 134 and the gearbox spline 112. As shown in FIG. 4, an o-ring 142 can be seated in the gearbox side o-ring groove 140.

The gearbox spline 112 can have an axial length l with a ratio of 0.16 to 1 (l/L) relative to the overall length L of the main shaft 102 as indicated in FIG. 3. The gearbox spline 112 can have a pitch diameter D with a ratio of 1.33 (D/d) to 1 relative to the pitch diameter d of the generator spline 106. The internal bore 104 can include a step up 144 in diameter, wherein the internal bore 104 has a larger diameter inboard of the gearbox spline 112 than it has inboard of the generator spline 106. The step up 144 in diameter can be located at a position 0.70 of the length L2 of the main shaft 102. The shear section 134 is axially between the generator spline 106 and the gearbox spline 112. The shear section 134 can have an exterior surface 146 defining a smaller diameter D2 than the diameter D3 of the internal boar 104 inboard of the gearbox spline 112. The step up 144 in diameter is proximate the gearbox side o-ring groove 140.

A method includes lubricating a gearbox spline (e.g. gear box spline 112) on an outer surface of an input shaft (e.g. input shaft 100) using oil driven through an internal bore (e.g. internal bore 104) defined through the input shaft, wherein the oil passes through at least one orifice (e.g orifices 118) defined through the input shaft from the internal bore to an exterior surface of the input shaft. The method can include using a gearbox (e.g. gearbox 126 of FIG. 4) to drive the input shaft and using the input shaft to drive a generator (e.g. generator 120 of FIG. 4). Those skilled in the art will readily appreciate that any suitable number of orifices 118 can be used without departing from the scope of this disclosure.

The methods and systems of the present disclosure, as described above and shown in the drawings, provide for torque shafts with superior properties inducing improved lubrication and cooling relative to traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
lubricating a gearbox spline on an outer surface of an input shaft using oil driven through an internal bore defined through the input shaft, wherein the oil passes through at least one orifice defined through the input shaft from the internal bore to an exterior surface of the input shaft, wherein the input shaft comprises:
an annular main shaft extending along a longitudinal axis with the internal bore configured for fluid flow through the annular main shaft;
a generator spline on a first exterior surface of a first end of the annular main shaft; and
a gearbox spline on a second exterior surface of a second end of the annular main shaft opposite the first end, wherein at least one orifice is defined through the annular main shaft from the internal bore to the exterior surface of the second end of the annular main shaft for flow of fluid from the internal bore to the exterior surface for cooling and lubrication, wherein the gearbox spline has an axial length with a ratio of 0.16 to 1 relative to that of the main shaft.

2. The method as recited in claim 1, further comprising using a gearbox to drive the input shaft and using the input shaft to drive a generator.

3. The method as recited in claim 1, wherein the at least one orifice is located between the generator spline and the gearbox spline.

4. The method as recited in claim 3, wherein the at least one orifice is located more proximate the gearbox spline than the generator spline.

5. The method as recited in claim 4, wherein the at least one orifice is located in an annular channel that is contiguous with a medial end of the gearbox spline.

6. The method as recited in claim 1, wherein the at least one orifice includes exactly two orifices and wherein the two orifices are diametrically opposed to one another.

7. The method as recited in claim 1, further comprising a shear section axially between the generator spline and the gearbox spline, wherein the main shaft has an annular wall thickness that is thinnest in the shear section.

8. The method as recited in claim 7, further comprising a generator side o-ring groove defined in the first exterior surface of the first end of the main shaft between the shear section and the generator spline.

9. The method as recited in claim 8, further comprising an o-ring seated in the generator side o-ring groove.

10. The method as recited in claim 8, further comprising a gearbox side o-ring groove defined in the exterior surface of the second end of the main shaft between the shear section and the gearbox spline.

11. The method as recited in claim 10, further comprising an o-ring seated in the gearbox side o-ring groove.

12. The method as recited in claim 1, further comprising a generator including a rotor with a spline engaged to the generator spline so the main shaft can drive the rotor rotationally.

13. The method as recited in claim 1, further comprising a gearbox including a spline engaged to the gearbox spline so the gearbox can drive the main shaft rotationally.

14. A method comprising:
lubricating a gearbox spline on an outer surface of an input shaft using oil driven through an internal bore defined through the input shaft, wherein the oil passes through at least one orifice defined through the input shaft from the internal bore to an exterior surface of the input shaft, wherein the input shaft comprises:
an annular main shaft extending along a longitudinal axis with the internal bore configured for fluid flow through the annular main shaft;
a generator spline on a first exterior surface of a first end of the annular main shaft; and
a gearbox spline on a second exterior surface of a second end of the annular main shaft opposite the first end, wherein at least one orifice is defined through the annular main shaft from the internal bore to the exterior surface of the second end of the annular main shaft for flow of fluid from the internal bore to the exterior surface for cooling and lubrication, wherein the gearbox spline has a pitch diameter with a ratio of 1.33 to 1 relative to that of the generator spline.

15. A method comprising:
lubricating a gearbox spline on an outer surface of an input shaft using oil driven through an internal bore defined through the input shaft, wherein the oil passes through at least one orifice defined through the input shaft from the internal bore to an exterior surface of the input shaft, wherein the input shaft comprises:
an annular main shaft extending along a longitudinal axis with the internal bore configured for fluid flow through the annular main shaft;
a generator spline on a first exterior surface of a first end of the annular main shaft; and
a gearbox spline on a second exterior surface of a second end of the annular main shaft opposite the first end, wherein at least one orifice is defined through the annular main shaft from the internal bore to the exterior surface of the second end of the annular main shaft for flow of fluid from the internal bore to the exterior surface for cooling and lubrication, wherein the internal bore includes a step up in diameter, wherein the internal bore has a larger diameter inboard of the gearbox spline than inboard of the generator spline.

16. The method as recited in claim 15, wherein the step up in diameter is located at a position 0.70 of the length of the main shaft.

17. The method as recited in claim 15, further comprising a shear section axially between the generator spline and the gearbox spline, wherein the shear section has a third exterior surface defining a smaller diameter than that of the internal boar inboard of the gearbox spline.

18. The method as recited in claim 15, further comprising a gearbox side o-ring groove defined in the exterior surface of the second end of the main shaft between the shear section and the gearbox spline, wherein the step up in diameter is proximate the gearbox side o-ring groove.

* * * * *